US011946611B2

(12) United States Patent
Pineau

(10) Patent No.: US 11,946,611 B2
(45) Date of Patent: Apr. 2, 2024

(54) LUMINOUS DEVICE WITH LIGHT LEAKAGE PREVENTION

(71) Applicant: VALEO VISION, Bobigny (FR)

(72) Inventor: Thomas Pineau, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/998,814

(22) PCT Filed: May 25, 2021

(86) PCT No.: PCT/EP2021/063946

§ 371 (c)(1),
(2) Date: Nov. 15, 2022

(87) PCT Pub. No.: WO2021/239753

PCT Pub. Date: Dec. 2, 2021

(65) Prior Publication Data

US 2023/0204183 A1 Jun. 29, 2023

(30) Foreign Application Priority Data

May 25, 2020 (FR) ...................................... 2005501

(51) Int. Cl.
*F21S 43/14* (2018.01)
*F21S 43/19* (2018.01)
*F21S 45/70* (2018.01)

(52) U.S. Cl.
CPC ............ *F21S 43/14* (2018.01); *F21S 43/195* (2018.01); *F21S 45/70* (2018.01)

(58) Field of Classification Search
CPC ................................ F21S 43/14; F21S 43/195
See application file for complete search history.

(56) References Cited

U.S. PATENT DOCUMENTS 8,599,566 B2 12/2013 Froehlich et al.
10,516,087 B2 12/2019 Seif et al.
(Continued)

FOREIGN PATENT DOCUMENTS

DE 20304579 U1 6/2003
EP 3273147 A1 1/2018
(Continued)

OTHER PUBLICATIONS

European Patent Office, International Search Report and Written Opinion of corresponding International Application No. PCT/EP2021/063946, dated Aug. 4, 2021.
(Continued)

*Primary Examiner* — Christopher E Dunay
(74) *Attorney, Agent, or Firm* — Valeo Vision

(57) ABSTRACT

The present invention pertains to a multi-functional luminous device for an automotive vehicle. The luminous device comprises two light sources adapted to generate different photometric functions. A light source support having two functional areas accommodates a first light source for generating first photometric function and a second functional area accommodates a second light source for generating second photometric function. Additionally, a groove is provided between adjoining functional areas and a shield is partially inserted into the groove for blocking the light between adjoining functional areas.

15 Claims, 4 Drawing Sheets

(56) References Cited

U.S. PATENT DOCUMENTS

| | | | | |
|---|---|---|---|---|
| 10,620,367 | B2 * | 4/2020 | Fitzpatrick | H05K 5/02 |
| 11,156,336 | B1 * | 10/2021 | Kim | F21S 43/247 |
| 2008/0013335 | A1 | 1/2008 | Tsutsumi | |
| 2014/0166974 | A1 | 6/2014 | Yoo et al. | |
| 2020/0182428 | A1 * | 6/2020 | Antonipieri | F21S 43/245 |
| 2021/0041078 | A1 * | 2/2021 | Park | B60Q 1/30 |
| 2021/0162911 | A1 * | 6/2021 | Illan | F21S 41/192 |
| 2022/0128212 | A1 * | 4/2022 | Shibayama | F21S 43/14 |

FOREIGN PATENT DOCUMENTS

| | | | |
|---|---|---|---|
| JP | S50133078 | U | 11/1975 |
| JP | S592005 | U | 1/1984 |
| JP | S5976007 | U | 5/1984 |
| JP | S6129406 | U | 2/1986 |
| JP | S61131004 | U | 8/1986 |
| JP | 2008192354 | A | 8/2008 |
| JP | 2010258451 | A | 11/2010 |
| JP | 2019016512 | A | 1/2019 |
| WO | 2018007385 | A1 | 1/2018 |

OTHER PUBLICATIONS

Japan Patent Office, Office Action (with English translation) of corresponding Japanese Patent Application No. 2022-572440, dated Nov. 7, 2023.

* cited by examiner

LUMINOUS DEVICE WITH LIGHT LEAKAGE PREVENTION

TECHNICAL FIELD

The present invention relates to a multi-functional luminous device for an automotive vehicle, and more particularly to a multi-functional luminous device, with a light leakage prevention system between the functional areas.

BACKGROUND OF THE INVENTION

Lighting devices are used in automobiles and the like, for lighting the path ahead, or give information to other road users, frontward, backward, or sideways. These modern lighting devices use different types of LED light sources to produce high efficiency light. The lighting devices are designed to perform multiple functions based on the requirement of the modern automobile. Tail lamps of an automotive vehicle perform various signaling functions such as brake light, turn indicator and tail light. As per regulation and the design purpose, it is required that the light from one area does not leak into the other areas. To address the same, various systems have been employed or are known in the past. One such known prior art is providing two different functional area with separate PCB (Printed Circuit Board) and light sources, and, then separate them using a wall or a shield. This system requires more space and modern lighting devices with sleek design cannot use such system. In addition, the systems involve tedious and complex assembly and increase the cost when several PCBs are used. Modern systems use a single PCB for multiple light sources. In this kind of system, the shield when provided has a small segment from where the light from one area of the lamp can leak to another area. In other words, a gap is needed between the shield and the PCB in order to avoid mechanical contact between these two elements, as the contact could generate damages, for example when the lamp is exposed to vibrations. Light leakage is possible through this gap.

The prior arts and the conventional methods have various disadvantages as described above and there is a need to come up with a lighting device which can accommodate the requirement of modern lighting device and also meet the regulation requirements.

BRIEF SUMMARY OF THE INVENTION

As an embodiment of the present invention, a luminous device for an automotive vehicle is provided with at least two light sources, wherein each light source is adapted to generate different photometric functions, a light source support having at least two functional areas, wherein a first functional area accommodates a first light source for generating first photometric function and a second functional area accommodates a second light source for generating a second photometric function; a groove provided between adjoining functional areas; and a shield partially inserted into the groove for blocking the light between adjoining functional areas.

In a nonlimiting embodiment of the present invention, a gap is present between the interior surface of the groove and the part of the shield inserted into the groove. In other words, the shield does not touch the light source support in the groove. The groove and the shield thus create a labyrinth. The light cannot go through said labyrinth and is blocked between adjoining functional areas.

In a nonlimiting embodiment of the present invention, the groove extends from one edge to the opposite edge of the light source support.

In a nonlimiting embodiment of the present invention, the groove is provided partially along the length of light source support.

In a nonlimiting embodiment of the present invention, the light source support comprises tracks running from first functional area to second functional area, and wherein the tracks are provided outside the groove area on the light source support.

In a nonlimiting embodiment of the present invention, the shape of the groove is polygonal in profile.

In a nonlimiting embodiment of the present invention, the shape of the groove is trapezoid in profile.

In a nonlimiting embodiment of the present invention, the shape of the groove is rectangular in profile.

In a nonlimiting embodiment of the present invention, the shape of the groove is curved in profile. In particular, the profile may be a portion of circle.

In a nonlimiting embodiment of the present invention, the shape of the groove is triangular in profile.

In a nonlimiting embodiment of the present invention, the depth of the groove is less than half of the thickness of light source support.

In a nonlimiting embodiment of the present invention, the depth of the grove ranges from 0.6 mm to 1.2 mm.

In a nonlimiting embodiment of the present invention, the groove is coated with light absorbing material.

In a nonlimiting embodiment of the present invention, the shield is coated with light absorbing material.

As example, the light absorbing material is a dark painting, especially a black painting. Any other dark, especially black coating material compatible with the material of the light source support and/or the shield can be used.

In a nonlimiting embodiment of the present invention the material of the light source support and/or the shield is a light absorbing material, dark, especially black.

In a nonlimiting embodiment of the present invention, the at least two light sources are LED.

In a nonlimiting embodiment of the present invention, the light source support is a printed circuit board.

In a nonlimiting embodiment of the present invention, the groove is made by milling.

In a nonlimiting embodiment of the present invention, the shield projects from a housing of the luminous device.

BRIEF DESCRIPTION OF THE DRAWINGS

To complete the description and to provide a better understanding of the invention, a set of drawings is provided. Said drawings form an integral part of the description and illustrate an embodiment of the invention, which should not be construed as restricting the scope of the invention, but only as an example of how the invention can be carried out. The drawings comprise the following characteristics.

DETAILED DESCRIPTION OF THE INVENTION

Hereinafter, embodiments of the present invention will be described with reference to the accompanying drawings.

Lighting modules of modern automotive are provided with multiple photometric function to achieve different functionality. As an example, in case of a tail lamp of an automotive, various functions such as brake light, turn indicator and tail light are provided. These system have different photometric functions based on the functionality. In these kind of lighting modules various provisions are provided so as one photometric function does not effects other functionalities through light leakage.

Figure 1A:
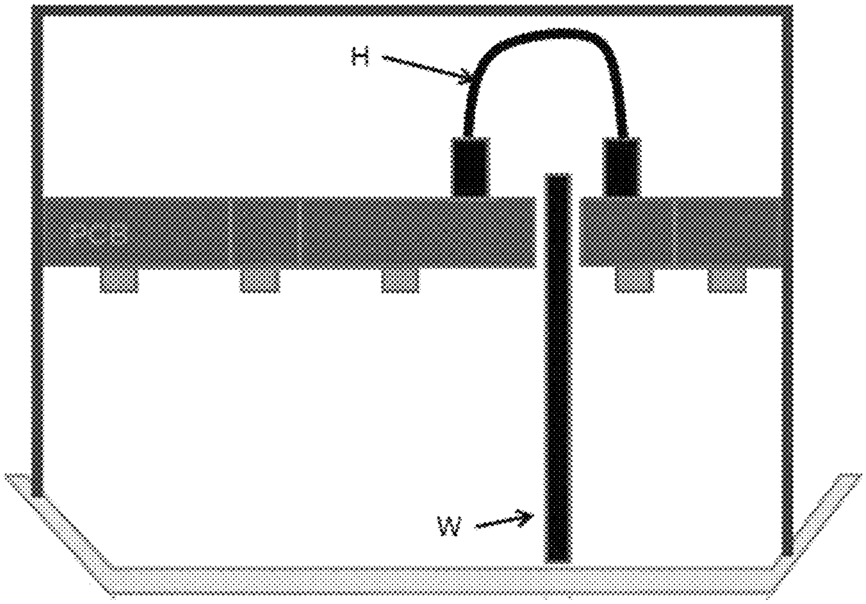
FIG. 1*a* shows a cross section of a luminous device having two set of light sources for generating different photometric effect, according to per an embodiment of prior known art.
Figure 1B:
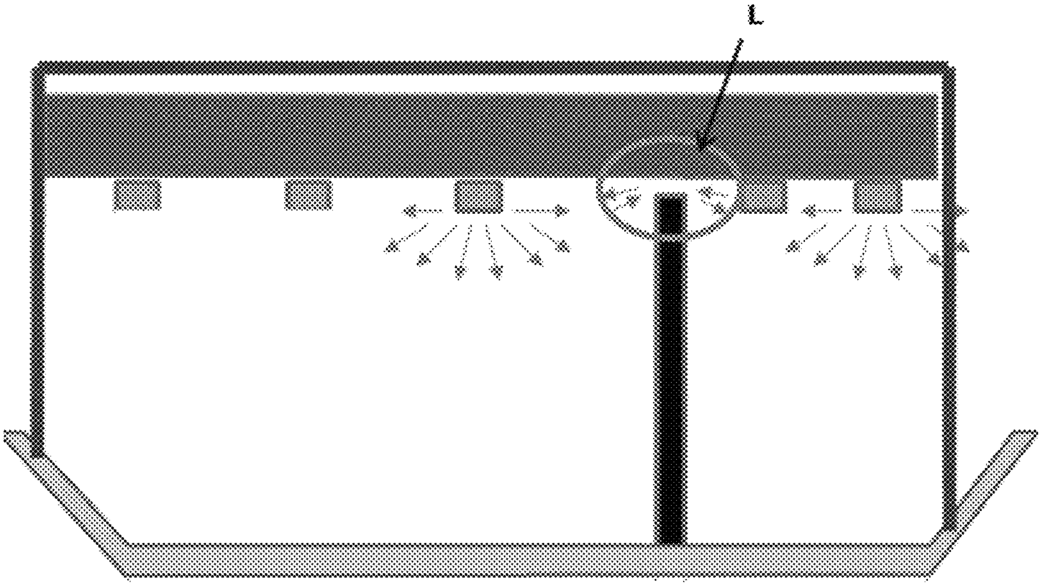
FIG. 1*b* shows a cross section of a luminous device having two set of light sources for generating different photometric effect, according to another embodiment of prior known art.

FIGS. 1*a* and 1*b* depict prior known solutions for lighting modules having two set of light sources for generating different photometric effect. In FIG. 1*a* there are provided two separate light source support for each photometric function and they are separated by means of a shield or wall (w). This shield prevents light leakages to adjacent areas, also the FIG. 1*a* shows a harness (H) used to connect the two light source support. The harness (H) is used in order to ensure power supply to the light sources (10*a*, 10*b*) on both the light source supports. The drawback of this setup is, it requires additional parts and involves additional time during assembly. FIG. 1*b*, shows a similar solution wherein a single light source support is used for generating various photometric function. Here also a shield is placed to prevent light leakage in the area surrounded on FIG. 1*b* (reference L). In this approach as the shield cannot touch the light source support there is still a possibility of light leakage in this area.

Figure 2:
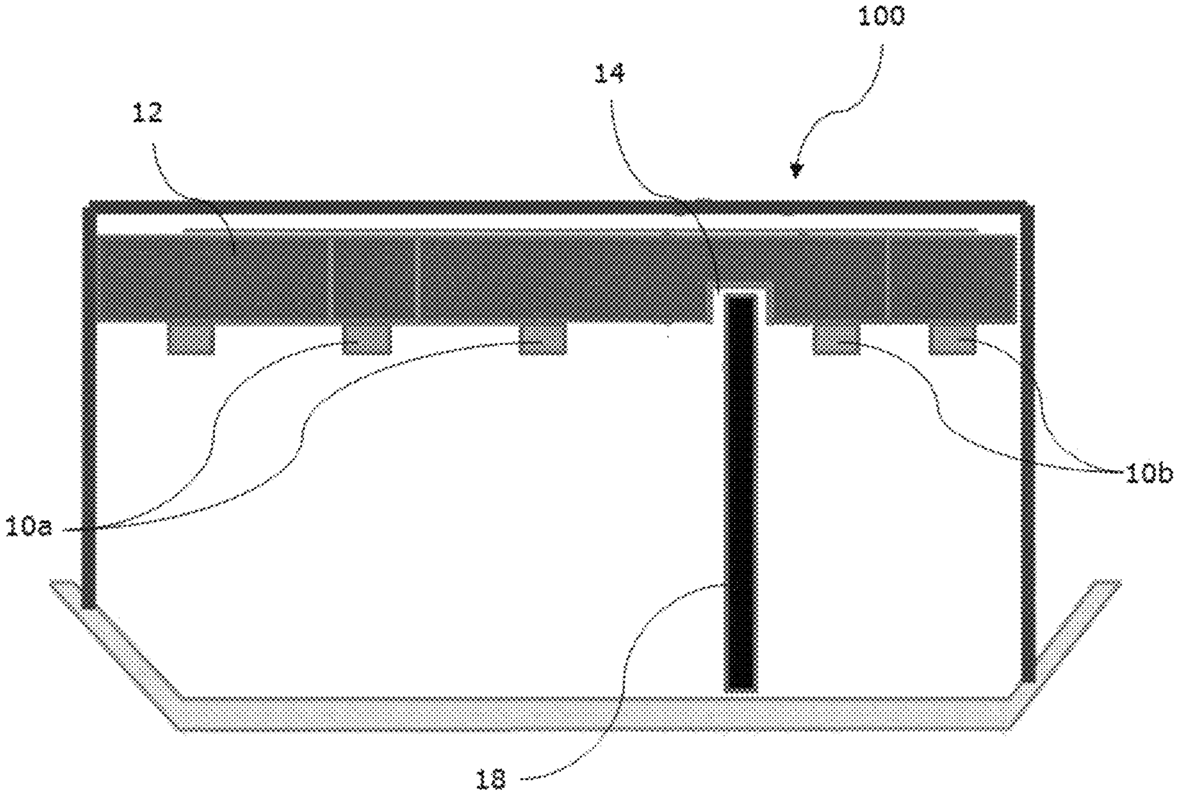
FIG. 2 shows a cross section of a luminous device having two set of light sources for generating different photometric effect, according to an embodiment of the present invention.

FIG. 2 shows a luminous device having two set of light sources for generating different photometric effect, according to an embodiment of the present invention. As seen in the FIG. 2, the luminous device (100) for an automotive vehicle comprises at least two set of light sources (10*a*, 10*b*). The at least two set of light sources is adapted to generate different photometric functions. For this purpose, the set of light sources light sources may have different emission levels and/or colors. The two set of sources namely the first light source (10*a*) and second light source (10*b*) are fixed on a light source support (12) having at least two functional areas. The first functional area accommodates the first light source (10*a*) for generating a first photometric function and the second functional area accommodates a second light source (10*b*) for generating second photometric function. The two different photometric functions generated by luminous device may be turn indicator or brake light or reverse light or tail light or any combination of the above. In some cases the luminous device may have more than two functionalities without deviating from the scope of the invention. In this case each functionality is related to a set of light sources which corresponds to a functional area on the light source support.

Figure 3:
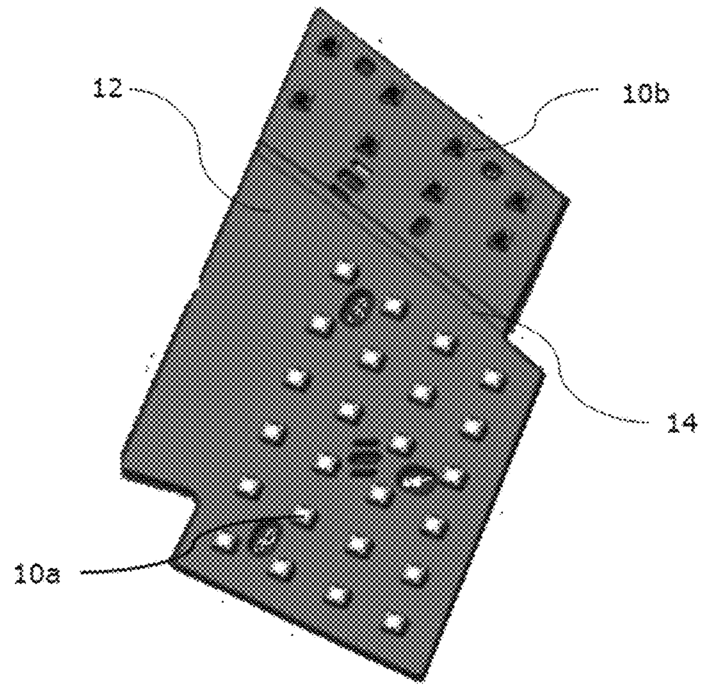
FIG. 3 shows a light source support of luminous device having two set of light sources along with a groove, according to an embodiment of the present invention.

As seen in FIG. 3, the light source support of the luminous device (100) having two set of light sources (10*a* and 10*b*) is provided with a groove (14), according to an embodiment of the present invention. The groove (14) is provided between the adjoining functional areas of the luminous device. In an embodiment of the present invention, the groove (14) is designed to extend from one edge of the light source support to the opposite edge, as it is visible on this figure. The groove (14) is made by removing the material from the light source support by milling process. The depth of the groove (14) is designed to be less than half of the thickness of light source support. The depth of the groove (14) in a nonlimiting embodiment of the invention ranges from 0.6 mm to 1.2 mm. In some nonlimiting embodiment, it is possible to have the thickness of the PCB such that groove depth is less than half of the thickness of the light source support and also range between 0.6 to 1.2 mm at the same time. The profile of the groove (14) in a nonlimiting embodiment is rectangular, when considered in a transversal section, i.e. a section by a plane perpendicular to the elongation direction of the groove. In addition to the above, other shapes such as triangular, curved, or similar profiles can also be used for the groove (14) to achieve similar results.

Figure 4:
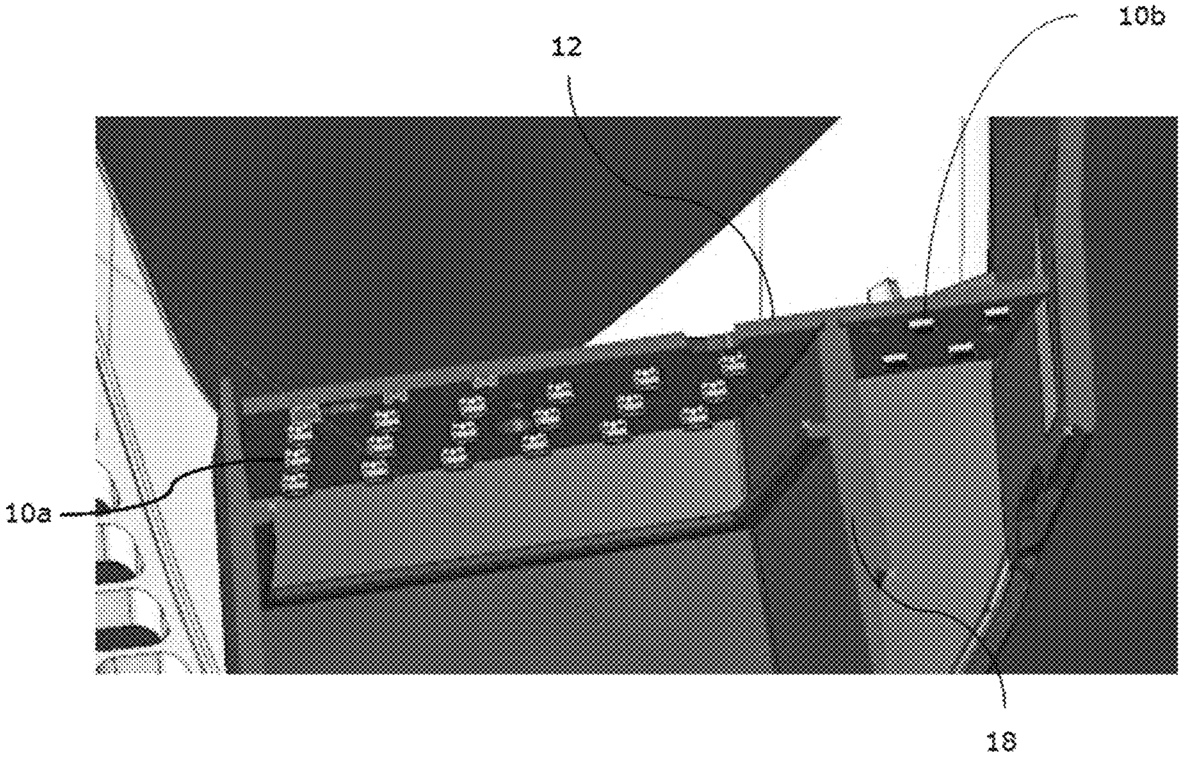
FIG. 4 shows a perspective view of luminous device of FIG. 2, having light source support with two set of light sources and shield, according to an embodiment of the present invention.
Figure 5:
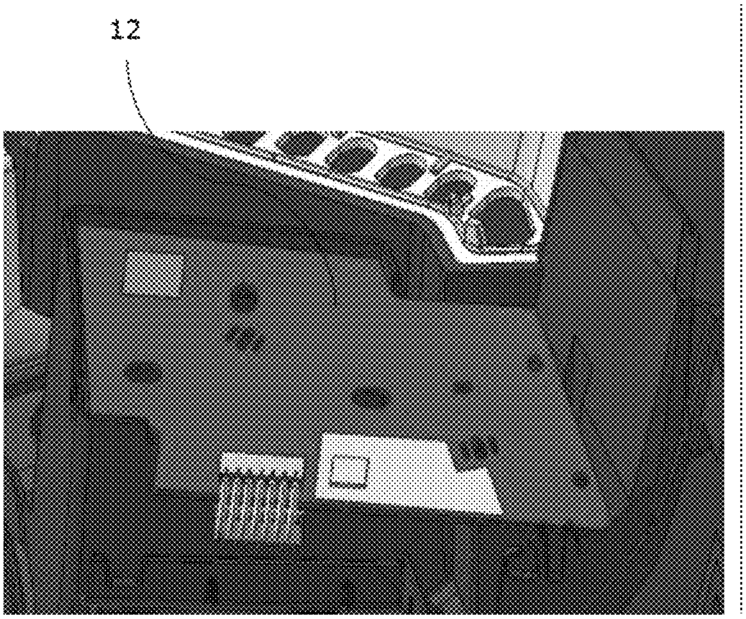
FIG. 5 shows a top view of the luminous device of FIG. 2 showing the single light source support, according to an embodiment of the present invention.

FIGS. 4 and 5, respectively show a perspective view and top view of luminous device of FIG. 2, having light source support with two set of light sources and shield, according to an embodiment of the present invention. The light source support (12) here is made of a single piece as seen in FIG. 5. Additionally, it can be seen in FIG. 4 that the functional areas of the light source support have distinct area on the same light source support.

Further, as seen in FIG. 2 a shield (18) is partially inserted into the groove (14). The shield (18) as seen from FIG. 3 is projected or is an integral part of the housing (not shown) of the luminous device. The shield (18) serves to block the light between the adjoining functional areas. The shield (18) is provided such that it partially inserts into the groove (18) such that the shield (18) crosses and goes beyond the surface of the light source support (12) supporting the light sources. A gap is present between the interior surface of the groove (14) and the part of the shield (18) inserted into the groove. In other words, the shield does not touch the light source support (12) in the groove (14). The groove (14) and the shield (18) thus create a labyrinth. The light cannot go through said labyrinth and is blocked between adjoining functional areas. The shield (18) does not support the light source support (12) thus preventing any interference in the luminous device. A contact between the shield and the light source support could damage them, and dust could be created by the abrasion due to the vibrations generated in a normal use of the device. The photometric function generated by the first light source (10*a*) is reflected back into the first functional area and similarly the photometric function generated by the second light source (10*b*) is reflected back into the second functional area by the shield (18). This prevents light leakage or leakage of photometric function from one functional area to adjoining functional area.

In an embodiment of the present invention, the groove (14) is provided partially along the length of light source support (12) of the luminous device (100). In this embodiment there is a space on the light support between at least one end of the groove and one edge of the support. The light source support (12) comprises tracks running from first functional area to second functional area, the tracks being provided outside the groove area on the light source support without interfacing with the groove (14). Further, the grooves can be coated with light absorbing material to improve the photometric function block capability. The shield (18) in some cases can also be coated with light absorbing material to prevent hot spots or unwanted photometric effect inside the functional area of the luminous device. In another embodiment of the present invention the material of the light source support and/or the shield is a light absorbing material.

In an embodiment, the light source support (12) is a printed circuit board where the at least two set of light sources (10_a_, 10_b_) are mounted. The light sources here are LEDs but in some cases can be any other type such a light bulbs, or laser, or laser diodes.

What is claimed is:

1. A luminous device for an automotive vehicle comprising:

at least two light sources, wherein each light source is adapted to generate different photometric functions;

a light source support having at least two functional areas, wherein a first functional area accommodates a first light source of the at least two light sources for generating a first photometric function and a second functional area accommodates a second light source of the at least two light sources for generating a second photometric function, with the at least two light sources fixed to the light source support;

a groove provided in the light source support between the at least two functional areas; and a shield partially inserted into the groove for blocking the light between the at least two functional areas.

2. A luminous device as claimed in claim 1, wherein the groove extends from one edge to the opposite edge of the light source support.

3. A luminous device as claimed in claim 1, wherein the groove is provided partially along the length of light source support.

4. A luminous device as claimed in claim 3, wherein the light source support comprises tracks running from the first functional area to the second functional area, and wherein the tracks are provided outside the groove.

5. A luminous device as claimed in claim 1, wherein the shape of the groove is rectangular in profile.

6. A luminous device as claimed in claim 1, wherein the shape of the groove is curved in profile.

7. A luminous device as claimed in claim 1, wherein the shape of the groove is triangular in profile.

8. A luminous device as claimed in claim 1, wherein the groove has a depth of less than half of the thickness of light source support.

9. A luminous device as claimed in claim 8, wherein the depth of the groove ranges from 0.6 mm to 1.2 mm.

10. A luminous device as claimed in claim 1, wherein the groove is coated with light absorbing material.

11. A luminous device as claimed in claim 1, wherein the shield is coated with light absorbing material.

12. A luminous device as claimed in claim 1, wherein the at least two light sources are LEDs.

13. A luminous device as claimed in claim 1, wherein the light source support is a printed circuit board.

14. A luminous device as claimed in claim 1, wherein the groove is made by milling.

15. A luminous device as claimed in claim 1, wherein the shield projects from a housing of the luminous device.

* * * * *